(12) United States Patent
Kondamudi (10) Patent No.: US 12,271,362 B2
(45) Date of Patent: *Apr. 8, 2025

(54) METHOD AND SYSTEM FOR CREATING EFFICIENT DATA STRUCTURE OF USERS AND COMMUNICATION DEVICES

(71) Applicant: WizRocket Inc., Mountain View, CA (US)

(72) Inventor: Suresh Kondamudi, Mumbai (IN)

(73) Assignee: WizRocket Inc., Mountain View, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/644,577

(22) Filed: Dec. 16, 2021

(65) Prior Publication Data

US 2023/0195707 A1    Jun. 22, 2023

(51) Int. Cl.
*G06F 16/22* (2019.01)
*G06F 11/34* (2006.01)
*G06F 21/62* (2013.01)

(52) U.S. Cl.
CPC ...... *G06F 16/2255* (2019.01); *G06F 11/3438* (2013.01); *G06F 21/6254* (2013.01)

(58) Field of Classification Search
CPC ............. G06F 16/2255; G06F 11/3438; G06F 21/6254

See application file for complete search history.

(56) References Cited

U.S. PATENT DOCUMENTS

| | | | |
|---|---|---|---|
| 9,183,520 B2* | 11/2015 | Davis | G06Q 10/06 |
| 11,334,548 B2 | 5/2022 | Kuimelis et al. | |
| 11,509,709 B1 | 11/2022 | Basak et al. | |
| 11,650,981 B1* | 5/2023 | Kondamudi | G06F 11/3419 707/713 |
| 11,782,893 B2* | 10/2023 | Kondamudi | G06F 16/22 707/741 |
| 2011/0078762 A1* | 3/2011 | Bijlsma | H04W 12/06 726/3 |
| 2012/0271909 A1 | 10/2012 | Huang et al. | |

(Continued)

FOREIGN PATENT DOCUMENTS

| | | | | |
|---|---|---|---|---|
| CN | 109167759 A | * | 1/2019 | ........... H04L 61/157 |
| WO | WO-2016073305 A1 | * | 5/2016 | ........... G06Q 30/016 |

OTHER PUBLICATIONS

Choi et al. "System and Method for Sharing Position Information Using Multiple IDS" KR 20150111331 A; Oct. 5, 2015 (Year: 2015).*

*Primary Examiner* — Dennis Truong
(74) *Attorney, Agent, or Firm* — Kolisch Hartwell, P.C.

(57) ABSTRACT

The present disclosure provides a method and system for creating efficient set data structure of a plurality of communication devices and a plurality of users using a hash-based system. The hash-based system receives a first set of data associated with the plurality of communication devices. The hash-based system obtains a second set of data associated with the plurality of users. The hash-based system converts the first set of data associated and the second set of data to a plurality of natural numbers. The hash-based system assigns a first key value to the first set of data and a second key value to the second set of data. The hash-based system maps the first key value or the second key value to a block index of a plurality of block indexes. The hash-based system creates the efficient data structure.

15 Claims, 3 Drawing Sheets

(56) References Cited

U.S. PATENT DOCUMENTS

| | | | |
|---|---|---|---|
| 2013/0080774 A1* | 3/2013 | Combet | H04L 63/0421 |
| | | | 713/168 |
| 2013/0276125 A1* | 10/2013 | Bailey | G06F 21/46 |
| | | | 726/25 |
| 2015/0163121 A1* | 6/2015 | Mahaffey | H04L 41/142 |
| | | | 707/687 |
| 2015/0188897 A1* | 7/2015 | Grigorovici | H04L 67/535 |
| | | | 726/4 |
| 2015/0281104 A1 | 10/2015 | Golshan et al. | |
| 2016/0055244 A1* | 2/2016 | Wang | G06F 16/337 |
| | | | 707/770 |
| 2017/0004324 A1 | 1/2017 | Seo et al. | |
| 2017/0060957 A1 | 3/2017 | Saladi et al. | |
| 2017/0295246 A1 | 10/2017 | Georgiou et al. | |
| 2017/0339178 A1* | 11/2017 | Mahaffey | H04L 41/142 |
| 2020/0057752 A1 | 2/2020 | Tofano | |
| 2020/0126106 A1* | 4/2020 | Winner | G06Q 50/01 |
| 2020/0233977 A1* | 7/2020 | Chickerur | G06F 21/6254 |
| 2020/0396072 A1 | 12/2020 | Maurer et al. | |
| 2020/0410025 A1 | 12/2020 | Arunmozhi et al. | |
| 2022/0019995 A1 | 1/2022 | Ngo et al. | |
| 2023/0185787 A1* | 6/2023 | Kondamudi | G06F 16/22 |
| | | | 707/741 |

* cited by examiner

METHOD AND SYSTEM FOR CREATING EFFICIENT DATA STRUCTURE OF USERS AND COMMUNICATION DEVICES

TECHNICAL FIELD

The present invention relates to the field of data structures and, in particular, relates to a method and system for creating an efficient data structure of users and multiple communication devices.

INTRODUCTION

Over the past few years, digital platforms have become a popular way for individuals and consumers to interact online. The digital platforms have been used to provide range of services to the individuals over the Internet. In addition, the digital platforms facilitate interactions between at least two or more distinct individuals (whether firms or consumers) through the range of services via the Internet. We have seen an increasing demand in the usage of the digital platforms. The individuals access the digital platforms using network-enabled computing devices. In addition, each of the individuals use multiple network-enabled computing devices to access the digital platforms. Further, management and storage of data associated with the individuals and the multiple network-enabled computing devices becomes essential for the digital platforms. Furthermore, the digital platforms require a system to create a data structure for managing and storing data related to each individual and each network-enabled computing device. However, as number of the individuals and the network-enabled computing devices increases, management and storing of the data becomes complex. In addition, the present systems and methods utilize hash maps for creating data structure of individuals and multiple network-enabled computing devices. Further, the present systems and methods for creating data structure of individuals and multiple network-enabled computing devices are inefficient, ineffective and costly.

SUMMARY

In a first example, a computer-implemented method is provided. The computer-implemented method is used for creating an efficient data structure of a plurality of communication devices and a plurality of users. The computer implemented method includes a first step to receive a first set of data associated with the plurality of communication devices. In addition, the computer-implemented method includes a second step to obtain a second set of data associated with the plurality of users. Further, the computer-implemented method includes a third step to convert the first set of data associated with each of the plurality of communication devices and the second set of data associated with each of the plurality of users to a plurality of natural numbers. The computer-implemented method includes a fourth step to map the first set of data or the second set of data to a first natural number of the plurality of natural numbers using an increment sequence method. Furthermore, the computer-implemented method includes a fifth step to assign a first key value to the first set of data associated with each of the plurality of communication devices and the second key value to the second set of data associated with each of the plurality of users. Moreover, the computer-implemented method includes a sixth step to map the first key value or the second key value to a block index of a plurality of block indexes. Also, the computer-implemented method includes a seventh step to create the efficient data structure based on the integral key values. The plurality of communication devices is associated with each of the plurality of users. Also, the first set of data corresponds to device data associated with each of the plurality of communication devices. The plurality of users accesses one or more digital platforms with utilization of the plurality of communication devices. The second set of data corresponds to personal identity information of each of the plurality of users. The plurality of natural numbers acts as integral key values for implementation of the efficient data structure. The increment sequence method enables generation of natural number of the plurality of natural numbers in an incremented way in a number sequence. Also, the hash-based system assigns the first key value to the first set of data and the second key value to the second set of data for increasing performance of the efficient data structure. Each of the first key value or the second key value is positioned inside the particular block index of the plurality of block indexes. The efficient data structure has high performance.

In an embodiment of the present disclosure, the efficient data structure stores the first key value and the second key value in pairs of key and value.

In an embodiment of the present disclosure, the first set of data includes mobile equipment identifier (MEID), international mobile equipment identity (IMEI), electronic serial number (ESN), international mobile subscriber identity (IMSI), media access control address (MAC address), and internet protocol address.

In an embodiment of the present disclosure, the second set of data includes name, age, electronic mail identity, contact number, gender, geographical location, and demographical information.

In an embodiment of the present disclosure, the one or more digital platforms includes an over-the top media platform, an e-commerce platform, a fintech platform, a social media platform, a health platform, an educational platform, a real-estate and housing platform, and a travel platform.

In an embodiment of the present disclosure, the one or more hash functions enables positioning of each of the first key value or the second key value inside the particular block index of the plurality of block indexes.

In second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for creating the efficient data structure of the plurality of communication devices and the plurality of users. The method includes a first step to receive the first set of data associated with the plurality of communication devices. In addition, the computer-implemented method includes a second step to obtain the second set of data associated with the plurality of users. Further, the computer-implemented method includes a third step to convert the first set of data associated with each of the plurality of communication devices and the second set of data associated with each of the plurality of users to the plurality of natural numbers. The computer-implemented method includes a fourth step to map the first set of data or the second set of data to a first natural number of the plurality of natural numbers using an increment sequence method. Furthermore, the computer-implemented method includes a fifth step to assign the first key value to the first set of data associated with each of the plurality of communication devices and the second key value to the second set of data associated with each of the plurality of users. Moreover, the computer-implemented method includes a sixth step to map the first key value or the second key value to a block index of a plurality of block indexes. Also, the computer-implemented method includes a seventh step to create the efficient data structure based on the integral key values. The plurality of communication devices is associated with the plurality of users. Also, the first set of data corresponds to device data of the each of the plurality of communication devices. The plurality of users accesses one or more digital platforms with utilization of the plurality of communication devices. The second set of data corresponds to personal identity information of each of the plurality of users. The plurality of natural numbers acts as integral key values for implementation of the efficient data structure. The increment sequence method enables generation of natural number of the plurality of natural numbers in an incremented way in a number sequence. Also, the hash-based system assigns the first key value to the first set of data and the second key value to the second set of data for increasing performance of the efficient data structure. Each of the first key value or the second key value is positioned inside the particular block index of the plurality of block indexes using one or more hash functions. The efficient data structure has high performance.

In an embodiment of the present disclosure, the efficient data structure stores the first key value and the second key value in pairs of key and value.

In an embodiment of the present disclosure, the first set of data includes mobile equipment identifier (MEID), international mobile equipment identity (IMEI), electronic serial number (ESN), international mobile subscriber identity (IMSI), media access control address (MAC address), and internet protocol address.

In an embodiment of the present disclosure, the second set of data includes name, age, electronic mail identity, contact number, gender, geographical location, and demographical information.

In an embodiment of the present disclosure, the one or more digital platforms includes an over-the top media platform, an e-commerce platform, a fintech platform, a social media platform, a health platform, an educational platform, a real-estate and housing platform, and a travel platform.

In an embodiment of the present disclosure, the one or more hash functions enables positioning of each of the first key value or the second key value inside the particular block index of the plurality of block indexes. In addition, the one or more hash functions minimize duplication of the plurality of natural numbers.

In a third example, a non-transitory computer-readable storage medium is provided. The non-transitory computer-readable storage medium encodes computer executable instructions that, when executed by at least one processor, performs a method for creating an efficient data structure of the plurality of communication devices and the plurality of users. The method includes a first step to receive the first set of data associated with the plurality of communication devices. In addition, the computer-implemented method includes a second step to obtain the second set of data associated with the plurality of users. Further, the computer-implemented method includes a third step to convert the first set of data associated with each of the plurality of communication devices and the second set of data associated with each of the plurality of users to the plurality natural numbers. The computer-implemented method includes a fourth step to map the first set of data or the second set of data to a first natural number of the plurality of natural numbers using an increment sequence method. Furthermore, the computer-implemented method includes a fifth step to assign the first key value to the first set of data associated with each of the plurality of communication devices and the second key value to the second set of data associated with each of the plurality of users. Moreover, the computer-implemented method includes a sixth step to map the first key value or the second key value to a block index of a plurality of block indexes. Also, the computer-implemented method includes a seventh step to create the efficient data structure based on the integral key values. The plurality of communication devices is associated with the plurality of users. Also, the first set of data corresponds to device data of the each of the plurality of communication devices. The plurality of users accesses one or more digital platforms with utilization of the plurality of communication devices. The second set of data corresponds to personal identity information of each of the plurality of users. The plurality of natural numbers acts as integral key values for implementation of the efficient data structure. The increment sequence method enables generation of natural number of the plurality of natural numbers in an incremented way in a number sequence. Also, the first key value is assigned to the first set of data and the second key value is assigned to the second set of data for increasing performance of the efficient data structure. Each of the first key value or the second key value is positioned inside the particular block index of the plurality of block indexes using one or more hash functions. The efficient data structure has high performance.

In an embodiment of the present disclosure, the efficient data structure stores the first key value and the second key value in pairs of key and value.

In an embodiment of the present disclosure, the first set of data includes mobile equipment identifier (MEID), international mobile equipment identity (IMEI), electronic serial number (ESN), international mobile subscriber identity (IMSI), media access control address (MAC address), and internet protocol address.

In an embodiment of the present disclosure, the second set of data includes name, age, electronic mail identity, contact number, gender, geographical location, and demographical information.

In an embodiment of the present disclosure, the one or more digital platforms includes an over-the top media platform, an e-commerce platform, a fintech platform, a social media platform, a health platform, an educational platform, a real-estate and housing platform, and a travel platform.

In an embodiment of the present disclosure, the one or more hash functions enables positioning of each of the first key value or the second key value inside the particular block index of the plurality of block indexes. In addition, the one or more hash functions minimizes duplication of the plurality of natural numbers.

BRIEF DESCRIPTION OF THE DRAWINGS

Having thus described the invention in general terms, reference will now be made to the accompanying drawings, which are not necessarily drawn to scale, and wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Figure 1:
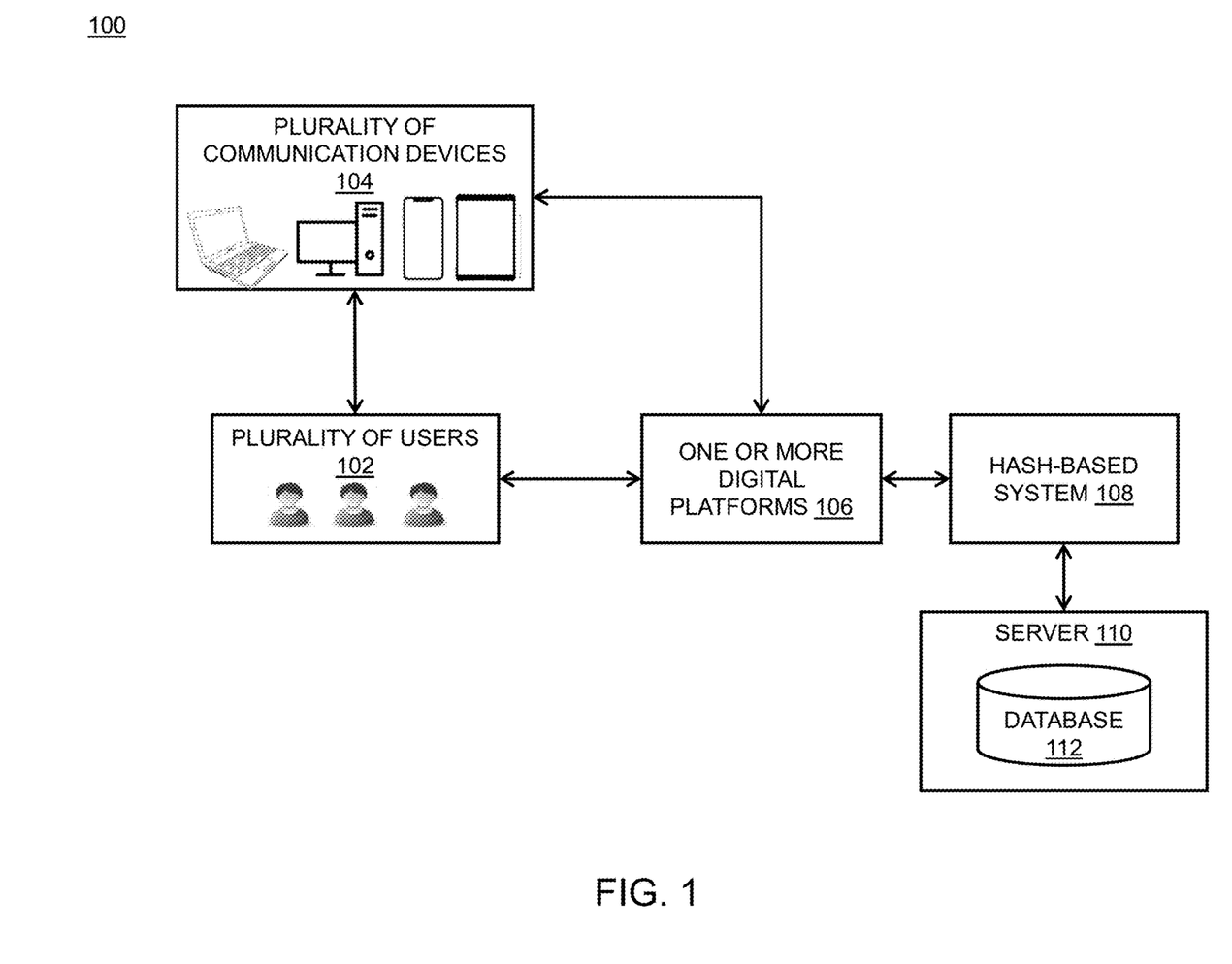
FIG. 1 illustrates an interactive computing environment for creating an efficient data structure of a plurality of users and a plurality of communication devices using a hash-based system, in accordance with various embodiments of the present disclosure.

FIG. 1 illustrates an interactive computing environment 100 for creating an efficient data structure of a plurality of users 102 and a plurality of communication devices 104 using a hash-based system 108, in accordance with various embodiments of the present disclosure. The interactive computing environment 100 includes the plurality of users 102, the plurality of communication devices 104, one or more digital platforms 106, the hash-based system 108, a server 110 and a database 112. The interactive computing environment 100 is any environment that facilitates the plurality of users 102 to access the one or more digital platforms 106.

The interactive computing environment 100 includes the plurality of users 102. The plurality of users 102 is any person or individual accessing the plurality of communication devices 104. In an embodiment of the present disclosure, the plurality of users 102 is an owner of the plurality of communication devices 104. In another embodiment of the present disclosure, the plurality of users 102 is not the owner of the plurality of communication devices 104. In an embodiment of the present disclosure, the plurality of users 102 accesses the plurality of communication devices 104 at home. In another embodiment of the present disclosure, the plurality of users 102 accesses the plurality of communication devices 104 at a cafe. In yet another embodiment of the present disclosure, the plurality of users 102 accesses the plurality of communication devices 104 in an office. In an example, a user U1 accesses a smartphone S1 while sitting in a living room. In another example, a user U2 accesses a laptop L1 while travelling from one place to another. In yet another example, a user U3 accesses a desktop computer D1 while working in the office.

The plurality of communication devices 104 is associated with the plurality of users 102. In an embodiment of the present disclosure, each of the plurality of communication devices 104 is a portable communication device. The portable communication device includes but may not be limited to a laptop, a smartphone, a tablet, and a smart watch. In another embodiment of the present disclosure, each of the plurality of communication devices 104 is a fixed communication device. The fixed communication device includes but may not be limited to a desktop computer, a smart television, a mainframe computer, and a workstation.

In an embodiment of the present disclosure, the plurality of communication devices 104 perform computing operations based on a suitable operating system installed inside the plurality of communication devices. In general, the operating system is system software that manages computer hardware and software resources and provides common services for computer programs. In addition, the operating system acts as an interface for software installed inside the plurality of communication devices 104 to interact with hardware components of the plurality of communication devices 104. In an embodiment of the present disclosure, each of the plurality of communication devices 104 performs computing operations based on any suitable operating system designed for the portable communication device. In an example, the operating system installed inside the plurality of communication devices 104 is a mobile operating system. Further, the mobile operating system includes but may not be limited to windows operating system, android operating system, iOS operating system, Symbian operating system, BADA operating system from Samsung Electronics and BlackBerry operating system, and sailfish. However, the operating system is not limited to above mentioned operating systems. In an embodiment of the present disclosure, the plurality of communication devices 104 operate on any version of particular operating system corresponding to above mentioned operating systems.

In another embodiment of the present disclosure, the plurality of communication devices 104 perform computing operations based on any suitable operating system designed for fixed communication device. In an example, the operating system installed inside the plurality of communication devices 104 is windows. In another example, the operating system installed inside the plurality of communication devices is Mac. In yet another example, the operating system installed inside the plurality of communication devices is Linux based operating system. In yet another example, the operating system installed inside the plurality of communication devices 104 is Chrome OS. In yet another example, the operating system installed inside the plurality of communication devices 104 is one of UNIX, *Kali* Linux, and the like. However, the operating system is not limited to above mentioned operating systems.

The plurality of users 102 interacts with one or more digital platforms 106 using the one or more communication devices 104. In addition, the plurality of users 102 accesses the one or more digital platforms 106 on the plurality of communication devices 104 through a plurality of web browsers. In general, digital platform is a computing platform which enables various individuals to obtain, upload and access valuable resources or services. The one or more digital platforms 106 include an over-the top media platform, an e-commerce platform, a fintech platform, a social media platform, and a health platform. In addition, the one or more digital platforms 106 include an educational platform, a real estate and housing platform, and a travel platform. However, the one or more digital platforms 106 are not limited to the above-mentioned digital platforms.

In an embodiment of the present disclosure, the one or more digital platforms 106 correspond to android operating system compatible application. In another embodiment of the present disclosure, the one or more digital platforms 106 correspond to windows operating system compatible applications. In yet another embodiment of the present disclosure, the one or more digital platforms 106 correspond to iPhone operating system compatible applications. In yet another embodiment of the present disclosure, the one or more digital platforms 106 correspond to mac operating system compatible applications. In yet another embodiment of the present disclosure, the one or more digital platforms 106 correspond to webpages. However, the one or more digital platforms 106 are not limited to the above-mentioned digital platforms.

In an embodiment of the present disclosure, the one or more digital platforms 106 include the over-the-top media platform. In general, the over-the-top media platform provides a streaming media service to the various individuals over internet. In addition, the over-the-top media platform has the plurality of OTT media contents. Further, the one or more digital platforms 106 include the e-commerce platform. In general, the e-commerce platform provides an online service of buying or selling of various products over the Internet.

In an embodiment of the present disclosure, the one or more digital platforms 106 include the fintech platform. In general, the fintech platform provides online financial services to the various individuals over the Internet. The one or more digital platforms 106 include the social media platform. In general, the social media platform facilitates creation and sharing of contents for various individuals over the internet.

In an embodiment of the present disclosure, the one or more digital platforms 106 include the heath platform. The health platform enables the various individuals to access personalized digital healthcare, diet and medicines to enhance the efficiency of healthcare delivery. In an embodiment of the present disclosure, the one or more digital platforms 106 include the education platform. The education platform enables students and parents to access personalized digital educational information, tools and resources to enhance the efficiency of educational development. In addition, the one or more digital platforms 106 include the real estate and housing platform. In general, the real estate and housing platform enables the various individuals to access personalized digital real estate and housing information and minimizes efforts of the corresponding individual. Further, the one or more digital platforms 106 include the travel platform that provides the plurality of travel services.

The plurality of users 102 corresponds to any number of person or individual associated with the hash-based system 108. The hash-based system 108 receives a first set of data. The first set of data is associated with the plurality of communication devices 104. The plurality of communication devices 104 is associated with the plurality of users 102. The first set of data corresponds to device data of each of the plurality of communication devices 104. The hash-based system 108 receives the first set of data in real time. In an example, the hash-based system 108 receives the first set of data when a user A accesses a communication device to work on the one or more digital platforms 106. The first set of data includes but may not be limited to mobile equipment identifier (MEID), international mobile equipment identity (IMEI), electronic serial number (ESN), international mobile subscriber identity (IMSI), media access control address (MAC address), and internet protocol address. In an embodiment of the present disclosure, the first set of data is received from one or more digital platform database, one or more communication devices database, and third party database.

Further, the hash-based system 108 obtains a second set of data. The second set of data is associated with the plurality of users 102. In an embodiment of the present disclosure, the hash-based system 108 obtains the second set of data when the plurality of users 102 accesses one or more digital platforms 106 with utilization of the plurality of communication devices 104. The second set of data corresponds to personal identity information of each of the plurality of users 102. The second set of data includes but may not be limited to name, age, electronic mail identity, contact number, gender, geographical location, and demographic information of the plurality of users 102. In an embodiment of the present disclosure, the second set of data is obtained from the plurality of users 102. In another embodiment of the present disclosure, the second set of data is obtained from one or more digital platform database, one or more communication devices database, and third party database.

The hash-based system 108 converts the first set of data associated with each of the plurality of communication devices 104 and the second set of data associated with each of the plurality of users 102 to a plurality of natural numbers. The plurality of natural numbers acts as integral key values for implementation of the efficient data structure. The hash-based system 108 maps the first set of data or the second set of data to a first natural number of the plurality of natural numbers using an increment sequence method. The increment sequence method enables generation of natural number of the plurality of natural numbers in an incremented way in a number sequence.

Furthermore, the hash-based system 108 assigns a first key value to the first set of data associated with each of the plurality of communication devices 104. Moreover, the hash-based system 108 assigns a second key value to the second set of data associated with each of the plurality of users 102. The hash-based system 108 assigns the first key value to the first set of data and the second key value to the second set of data to increase performance of the efficient data structure. In an embodiment of the present disclosure, the first key value and the second key value are assigned sequentially.

The hash-based system 108 maps the first key value or the second key value to a block index of a plurality of block indexes of integer sequences. In addition, each of the first key value or the second key value is positioned inside the particular block index of the plurality of block indexes using one or more hash functions. In general, hash functions are used for mapping any data of arbitrary size to fixed-size values. In an embodiment of the present disclosure, the one or more hash functions enables positioning of the first key value or the second key value inside the particular block index of the plurality of block indexes. The one or more hash functions minimize duplication of the plurality of natural numbers. Further, the hash-based system 108 creates the efficient data structure based on the integral key values. The efficient data structure stores the first key value and the second key value in pairs of key and value. In an example, the first key value and the second key value are stored in a pair of key "i" and value "j". Each key and value pair is unique. In addition, key and value pair is utilized to delete, update and search data elements easily from the efficient data structure. The efficient data structure has high performance. The first key value and the second key value increase performance of the efficient data structure.

The interactive computing environment 100 includes the server 110, and the database 112. The hash-based system 108 is associated with the server 110. In general, server is a computer program or device that provides functionality for other programs or devices. The server 110 provides various functionalities, such as sharing data or resources among multiple clients, or performing computation for a client. However, those skilled in the art would appreciate that the hash-based system 108 is connected to more number of servers. Furthermore, it may be noted that the server 110 includes a random access memory connected to the non-volatile storage system. In an embodiment of the present disclosure, the random access memory is connected to the non-volatile storage system through a bus. In addition, the random access memory allows the server 110 to store data associated with the plurality of communication devices 104 and the plurality of users 102 in the non-volatile storage system using the bus. Further, the server 110 includes the database 112. However, those skilled in the art would appreciate that more number of the servers include more numbers of database.

In an embodiment of the present disclosure, the hash-based system 108 is located in the server 110. In another embodiment of the present disclosure, the hash-based system 108 is connected with the server 110. In yet another embodiment of the present disclosure, the hash-based system 108 is a part of the server 110. The server 110 handles each operation and task performed by the hash-based system 110. The server 110 stores one or more instructions for performing the various operations of the hash-based system 108. The server 110 is located remotely from the hash-based system 108. The server 110 is associated with an administrator. In general, administrator manages the different components of system. The administrator coordinates the activities of the components involved in the hash-based system 108. The administrator is any person or individual who monitors the working of the hash-based system 108 and the server 110 in real-time. The administrator monitors the working of the hash-based system 108 and the server 110 through a communication device. The communication device includes the laptop, the desktop computer, the tablet, a personal digital assistant and the like.

The database 112 stores different sets of information associated with various components of the hash-based system 108. In general, the database 112 is used to hold general information and specialized data, such as characteristics data of the plurality of users, data of the one or more communication devices, data of the one or more digital platforms 106 and the like. The database 112 stores the information of the one or more digital platforms 106, the plurality of communication devices 104, the profiles of the plurality of users 102, demographic information of the plurality of users 102 and the like. The database 112 organizes the data using model such as relational models or hierarchical models. Further, the database 112 stores data provided by the administrator.

Figure 2:
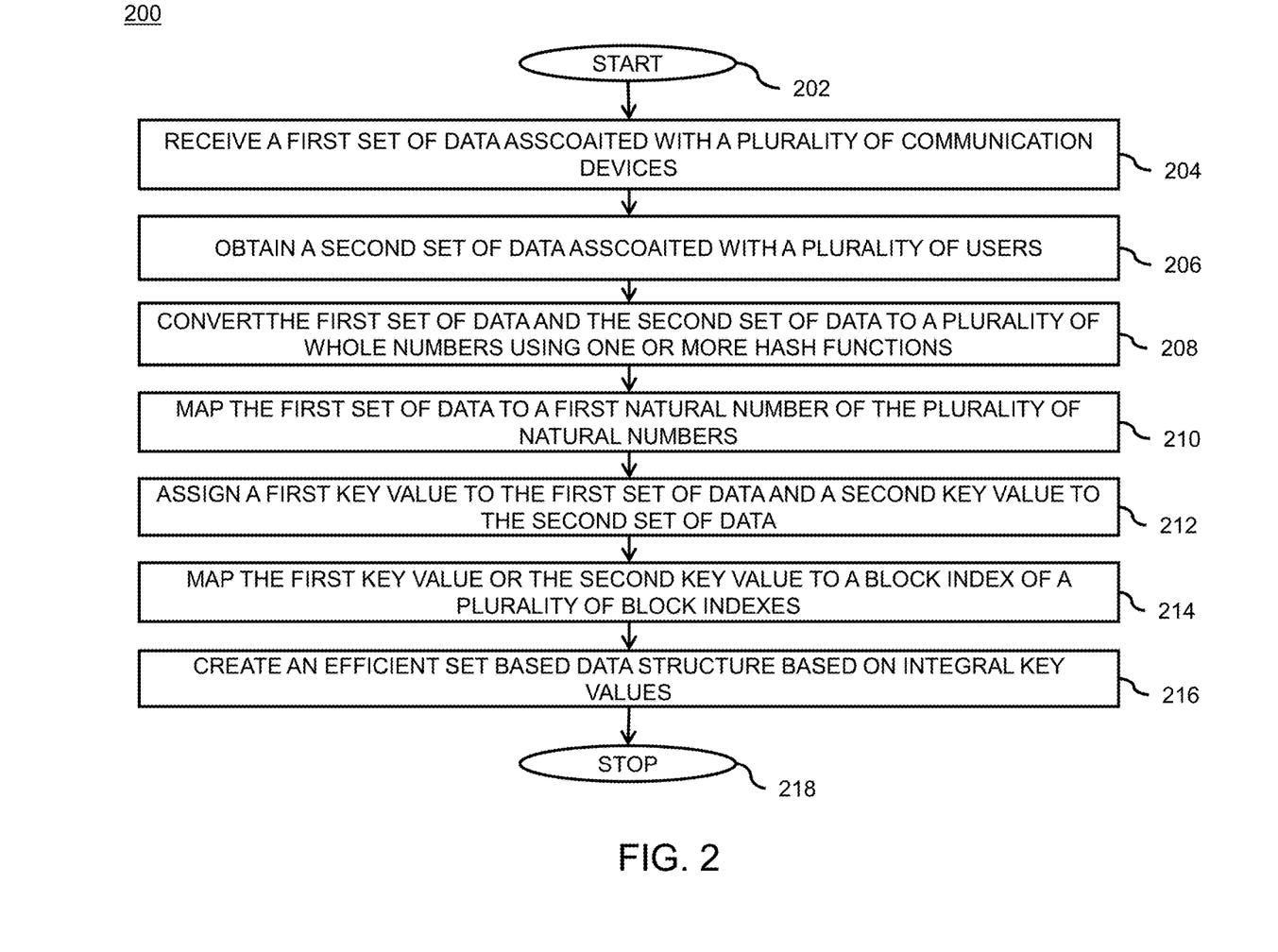
FIG. 2 illustrates a flow chart depicting a method for creating the efficient data structure of the plurality of users and the plurality of communication devices, in accordance with various embodiments of the present disclosure.

FIG. 2 illustrates a flow chart 200 depicting a method for creating the efficient data structure of the plurality of users 102 and the plurality of communication devices 104, in accordance with various embodiments of the present disclosure. It may be noted that in order to explain the method steps of the flowchart 200, references will be made to the elements explained in FIG. 1.

The flow chart 200 initiates at step 202. Following step 202, at step 204, the hash-based system 108 receives the first set of data associated with the plurality of communication devices 104. The first set of data corresponds to device data of the each of the plurality of communication devices 104. At step 206, the hash-based system 108 obtains the second set of data associated with the plurality of users 102. The plurality of users 102 accesses the one or more digital platforms 106 with utilization of the plurality of communication devices 104. The second set of data corresponds to personal identity information of each of the plurality of users 102. At step 208, the hash-based system 108 converts the first set of data associated with each of the plurality of communication devices 104 and the second set of data associated with each of the plurality of users 102 to the plurality of natural numbers. The plurality of natural numbers acts as integral key values for implementation of the efficient data structure. At step 210, the hash-based system 108 maps the first set of data or the second set of data to a first natural number of the plurality of natural numbers using an increment sequence method. The increment sequence method enables generation of natural number of the plurality of natural numbers in an incremented way in a number sequence.

At step 212, the hash-based system 108 assigns the first key value to the first set of data associated with each of the plurality of communication devices and the second key value to the second set of data associated with each of the plurality of users 102. At step 214, the hash-based system 108 maps the first key value or the second key value to a block index of a plurality of block indexes. Each of the first key value or the second key value is positioned inside the particular block index of the plurality of block indexes based on implementation of the one or more hash functions. At step 216, the hash-based system 108 creates the efficient data structure based on the integral key values. The efficient data structure has high performance.

The flow chart 200 terminates at step 218. It may be noted that the flowchart 200 is explained to have above stated process steps; however, those skilled in the art would appreciate that the flowchart 200 may have more/less number of process steps which may enable all the above stated embodiments of the present disclosure.

Figure 3:
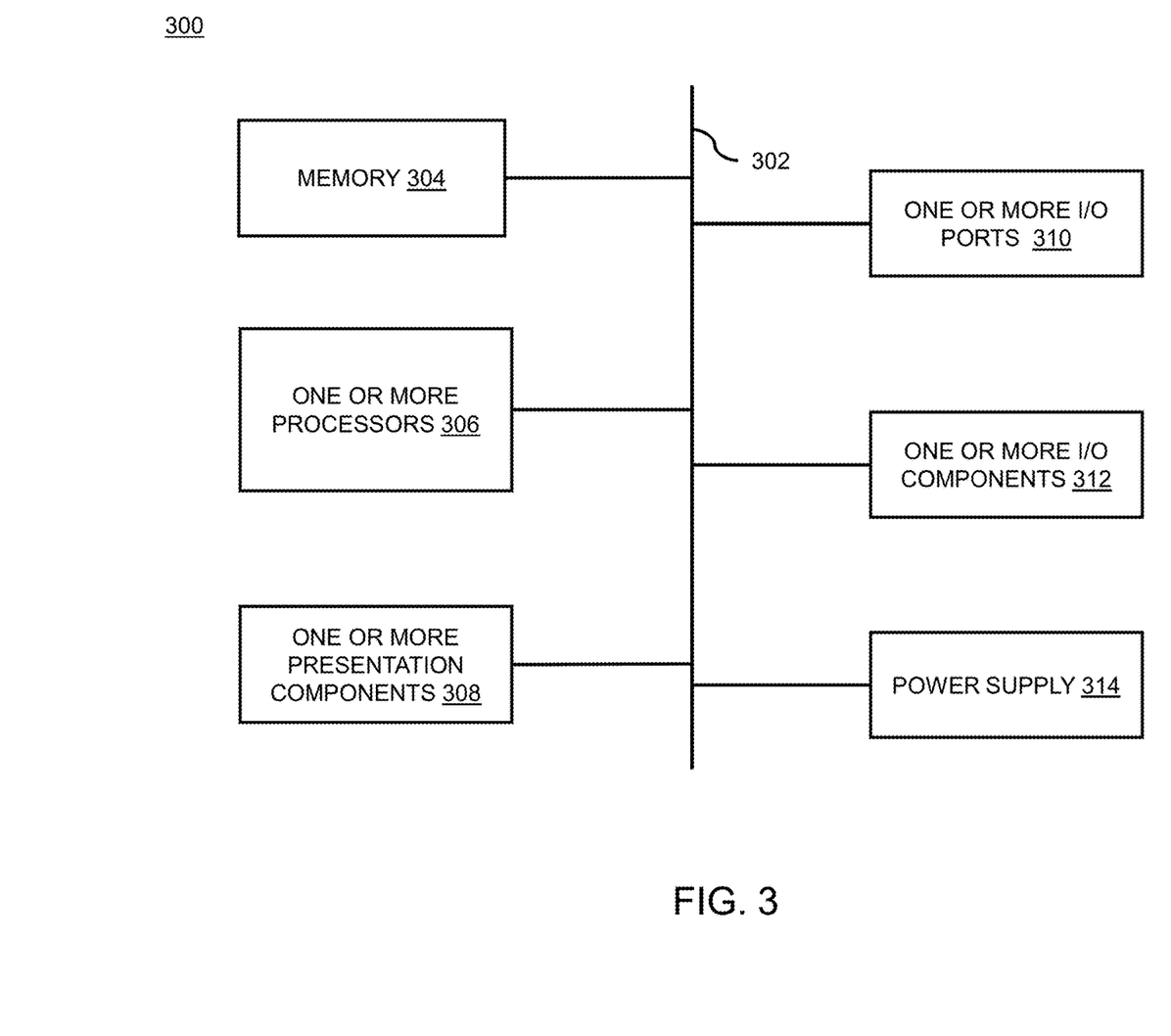
FIG. 3 illustrates a block diagram of a computing device, in accordance with various embodiments of the present disclosure.

FIG. 3 illustrates a block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may include computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for creating an efficient data structure of a plurality of communication devices and a plurality of users, the computer-implemented method comprising:

receiving, at a hash-based system with a processor, a first set of data associated with the plurality of communication devices, wherein the plurality of communication devices is associated with each of the plurality of users, wherein the first set of data corresponds to device data associated with each of the plurality of communication devices;

obtaining, at the hash-based system with the processor, a second set of data associated with the plurality of users, wherein the plurality of users accesses one or more digital platforms with utilization of the plurality of communication devices, wherein the second set of data corresponds to personal identity information of each of the plurality of users;

converting, at the hash-based system with the processor, the first set of data associated with each of the plurality of communication devices and the second set of data associated with each of the plurality of users to a plurality of natural numbers, wherein the plurality of natural numbers acts as integral key values for implementation of the efficient data structure;

mapping, at the hash-based system with the processor, the first set of data or the second set of data to a first natural number of the plurality of natural numbers using an increment sequence method, wherein the increment sequence method enables generation of natural number of the plurality of natural numbers in an incremented way in a number sequence;

assigning, at the hash-based system with the processor, a first key value to the first set of data associated with each of the plurality of communication devices and a second key value to the second set of data associated with each of the plurality of users, wherein the hash-based system with the processor assigns the first key value to the first set of data and the second key value to the second set of data for increasing performance of the efficient data structure;

mapping, at the hash-based system with the processor, the first key value or the second key value to a block index of a plurality of block indexes;

positioning, at the hash-based system with the processor, each of the first key value and the second key value inside a corresponding block index of the plurality of block indexes based on an implementation of one or more hash functions wherein the one or more hash functions minimizes duplication of the plurality of natural numbers; and creating, at the hash-based system with the processor, the efficient data structure based on the integral key values, wherein the efficient data structure has high performance.

2. The computer implemented method as claimed in claim 1, wherein the efficient data structure stores the first key value and the second key value in pairs of key and value.

3. The computer-implemented method as claimed in claim 1, wherein the first set of data comprising mobile equipment identifier (MEID), international mobile equipment identity (IMEI), electronic serial number (ESN), international mobile subscriber identity (IMSI), media access control address (MAC address), and internet protocol address.

4. The computer-implemented method as claimed in claim 1, wherein the second set of data comprising name, age, electronic mail identity, contact number, gender, geographical location, and demographical information.

5. The computer-implemented method as claimed in claim 1, wherein the one or more digital platforms comprising an over-the top media platform, an e-commerce platform, a fintech platform, a social media platform, a health platform, an educational platform, a real-estate and housing platform, and a travel platform.

6. A computer system comprising:
one or more processors; and
a memory coupled to the one or more processors, the memory for storing instructions which, when executed by the one or more processors, cause the one or more processors to perform a method for creating an efficient data structure of a plurality of communication devices and a plurality of users, the method comprising:
receiving, at a hash-based system, a first set of data associated with the plurality of communication devices, wherein the plurality of communication devices is associated with each of the plurality of users, wherein the first set of data corresponds to device data associated with each of the plurality of communication devices;
obtaining, at the hash-based system, a second set of data associated with the plurality of users, wherein the plurality of users accesses one or more digital platforms with utilization of the plurality of communication devices, wherein the second set of data corresponds to personal identity information of each of the plurality of users;
converting, at the hash-based system, the first set of data associated with each of the plurality of communication devices and the second set of data associated with each of the plurality of users to a plurality of natural numbers, wherein the plurality of natural numbers acts as integral key values for implementation of the efficient data structure;
mapping, at the hash-based system, the first set of data or the second set of data to a first natural number of the plurality of natural numbers using an increment sequence method, wherein the increment sequence method enables generation of natural number of the plurality of natural numbers in an incremented way in a number sequence;

assigning, at the hash-based system, a first key value to the first set of data associated with each of the plurality of communication devices and a second key value to the second set of data associated with each of the plurality of users, wherein the hash-based system with the processor assigns the first key value to the first set of data and the second key value to the second set of data for increasing performance of the efficient data structure;

mapping, at the hash-based system, the first key value or the second key value to a block index of a plurality of block indexes;

positioning, at the hash-based system, each of the first key value and the second key value inside a corresponding block index of the plurality of block indexes based on an implementation of one or more hash functions wherein the one or more hash functions minimizes duplication of the plurality of natural numbers; and creating, at the hash-based system, the efficient data structure based on the integral key values, wherein the efficient data structure has high performance.

7. The computer system as claimed in claim 6, the efficient data structure stores the first key value and the second key value in pairs of key and value.

8. The computer system as claimed in claim 6, wherein the first set of data comprising mobile equipment identifier (MEID), international mobile equipment identity (IMEI), electronic serial number (ESN), international mobile subscriber identity (IMSI), media access control address (MAC address), and internet protocol address.

9. The computer system as claimed in claim 6, wherein the second set of data comprising name, age, electronic mail identity, contact number, gender, geographical location, and demographical information.

10. The computer system as claimed in claim 6, wherein the one or more digital platforms comprising an over-the top media platform, an e-commerce platform, a fintech platform, a social media platform, a health platform, an educational platform, a real-estate and housing platform, and a travel platform.

11. A non-transitory computer-readable storage medium encoding computer executable instructions that, when executed by at least one processor, performs a method for creating an efficient data structure of a plurality of communication devices and a plurality of users, the method comprising:
receiving, at a computing device, a first set of data associated with the plurality of communication devices, wherein the plurality of communication devices is associated with each of the plurality of users, wherein the first set of data corresponds to device data associated with each of the plurality of communication devices;
obtaining, at the computing device, a second set of data associated with the plurality of users, wherein the plurality of users accesses one or more digital platforms with utilization of the plurality of communication devices, wherein the second set of data corresponds to personal identity information of each of the plurality of users;

converting, at the computing device, the first set of data associated with each of the plurality of communication devices and the second set of data associated with each of the plurality of users to a plurality of natural numbers, wherein the plurality of natural numbers acts as integral key values for implementation of the efficient data structure;

mapping, at the computing device, the first set of data or the second set of data to a first natural number of the plurality of natural numbers using an increment sequence method, wherein the increment sequence method enables generation of natural number of the plurality of natural numbers in an incremented way in a number sequence;

assigning, at the computing device, a first key value to the first set of data associated with each of the plurality of communication devices and a second key value to the second set of data associated with each of the plurality of users, wherein the hash-based system with the processor assigns the first key value to the first set of data and the second key value to the second set of data for increasing performance of the efficient data structure;

mapping, at the computing device, the first key value or the second key value to a block index of a plurality of block indexes;

positioning, at the computing device, each of the first key value and the second key value inside a corresponding block index of the plurality of block indexes based on an implementation of one or more hash functions wherein the one or more hash functions minimizes duplication of the plurality of natural numbers; and creating, at the computing device, the efficient data structure based on the integral key values, wherein the efficient data structure has high performance.

12. The non-transitory computer-readable storage medium as claimed in claim 11, wherein the efficient data structure stores the first key value and the second key value in pairs of key and value.

13. The non-transitory computer-readable storage medium as claimed in claim 11, wherein the first set of data comprising mobile equipment identifier (MEID), international mobile equipment identity (IMEI), electronic serial number (ESN), international mobile subscriber identity (IMSI), media access control address (MAC address), and internet protocol address.

14. The non-transitory computer-readable storage medium as claimed in claim 11, wherein the second set of data comprising name, age, electronic mail identity, contact number, gender, geographical location, and demographical information.

15. The non-transitory computer-readable storage medium as claimed in claim 11, wherein the one or more digital platforms comprising an over-the top media platform, an e-commerce platform, a fintech platform, a social media platform, a health platform, an educational platform, a real-estate and housing platform, and a travel platform.

* * * * *